United States Patent [19]

Borcherding

[11] 4,177,762

[45] Dec. 11, 1979

[54] FARROWING CRATE

[76] Inventor: Norbert R. Borcherding, Box 128, Garnavillo, Iowa 52049

[21] Appl. No.: 910,199

[22] Filed: May 30, 1978

[51] Int. Cl.² .............................................. A01K 1/02
[52] U.S. Cl. .................................................... 119/20
[58] Field of Search ......................................... 119/20

[56] References Cited

U.S. PATENT DOCUMENTS

| 2,928,371 | 3/1960 | Baker | 119/20 |
| 3,307,519 | 3/1967 | Rink et al. | 119/20 |
| 4,006,715 | 2/1977 | Redmon et al. | 119/20 |

*Primary Examiner*—Russell R. Kinsey
*Assistant Examiner*—Daniel J. Leach
*Attorney, Agent, or Firm*—James C. Nemmers; Haven E. Simmons

[57] ABSTRACT

A farrowing crate for sows which crate is adjustable in size to accommodate different sows. Adjustability of the crate is accomplished by pivotally mounted side panels each of which has flared ends spaced different distances from the pivot. When the side panels are swung 180°, the interior dimensions of the crate are varied.

6 Claims, 5 Drawing Figures

FARROWING CRATE

BACKGROUND OF THE INVENTION

Farrowing crates are extensively used by those in the business of breeding hogs. Most farrowing crates or pens are constructed from iron rods and bars which are either welded or bolted together to form a generally rectangular shaped enclosure. There are numerous designs of farrowing crates many of which can be adjusted to accommodate different size sows. The common method of providing for adjustability is to interconnect the various components of the crate by the use of bolts or pins which can be inserted into selected ones of a plurality of holes. This of course requires time as well as the use of hand tools in order to remove the pins or bolts and reinsert them into different openings to vary the interior dimensions of the crate. Also, because the components are often joined with the use of telescoping tubes or bars which must be drilled with a plurality of openings to provide for the adjustability, the manufacturing cost of adjustable farrowing crates is increased, thus increasing the cost to the breeder-purchaser.

There is therefore a need for an inexpensive farrowing crate which can be quickly and readily adjusted in size to accommodate different sows. Preferably, such adjustments in size should be made without the necessity of using hand or other tools.

SUMMARY OF THE INVENTION

The basic farrowing crate of the invention consists of end panels joined to side panels to form a generally rectangular interior space. Each of the side panels is pivotally connected to the end panels and held in a selected position by adjustable fasteners which do not require the use of bolts, pins or other means to hold them in place. Each side panel has a top end and a bottom end which ends are flared outwardly in opposite directions. The distance of one flared end from the pivot is greater than the distance of the other flared end, and, therefore, when a side panel is swung through 180°, the interior dimensions of the crate are either increased or decreased. The adjustability is thus accomplished without the use of any bolts, pins or tools, it being merely necessary to slide the adjustable fasteners from a locked to an unlocked position, swing the side panel 180° and then move the adjustable fasteners back into locked position.

DESCRIPTION OF THE PREFERRED EMBODIMENT OF THE INVENTION

Figure 1:
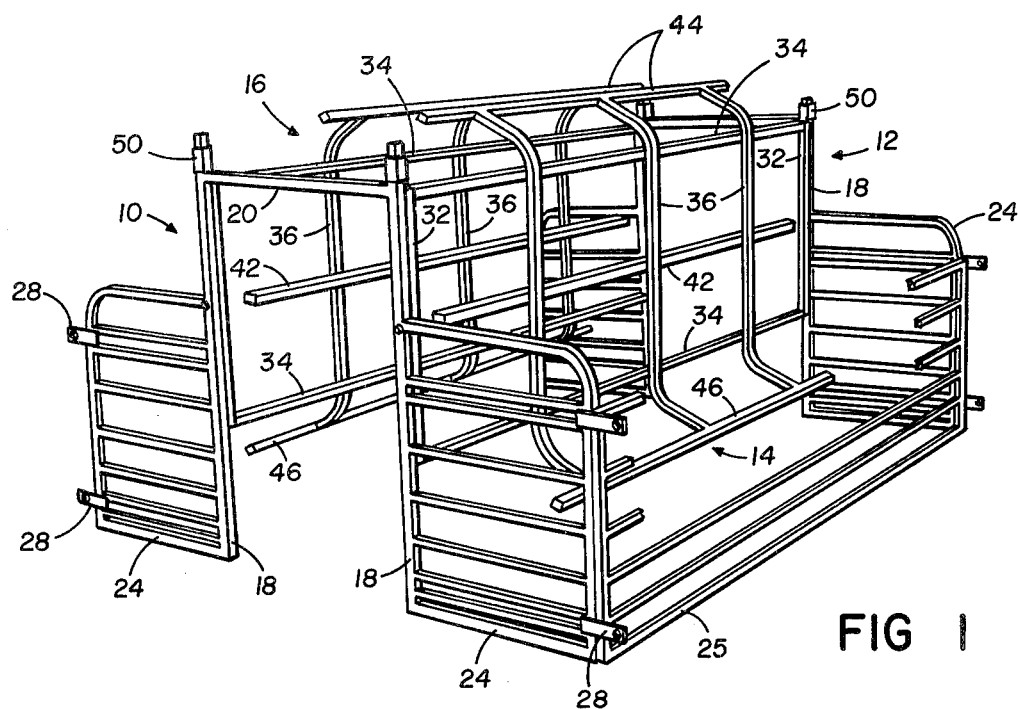
FIG. 1 is a perspective view of a farrowing crate constructed according to the principles of the invention.

The drawings illustrate a basic farrowing crate that incorporates the principles of the invention. The farrowing crate illustrated in the drawings does not include or show a floor since the basic farrowing crate can be rested upon the existing floor of any hog confinement or finishing building. Also, the drawings do not show either front or back doors in the end panels, but it should be understood that at least a back door panel would normally be used in connection with the farrowing crate.

The basic farrowing crate is comprised of a front end panel 10 and a back or rear end panel 12 which are joined together and interconnected to side panels indicated generally by the reference numerals 14 and 16. The front panel 10 and rear panel 12 are identical and each includes two central vertical uprights 18 which are spaced apart and parallel to each other and joined by a horizontal top member 20. The vertical uprights 18 and top member 20 define a rectangular shaped opening 19 into which there can be positioned a door (not shown). Normally, a door would be provided for the rear panel 12 while a door for the front panel 10 is optional. Each of the end panels 10 and 12 has extending outwardly from it a support panel 24 which includes a plurality of horizontal bars 26 and outwardly extending flanges 28 that provides for bolting together of two or more farrowing crates. A side divider panel 25 (shown in part on only one side of FIG. 1) can be connected between the outer edges of the support panels 24 of the front end panel 10 and rear end panel 12 to separate adjacent farrowing crates when two or more crates are connected together. Divider panels 25 can also be used to confine the baby pigs while allowing them the freedom to move about in the area between the support panels 24 and the divider panels 25.

Figure 2:
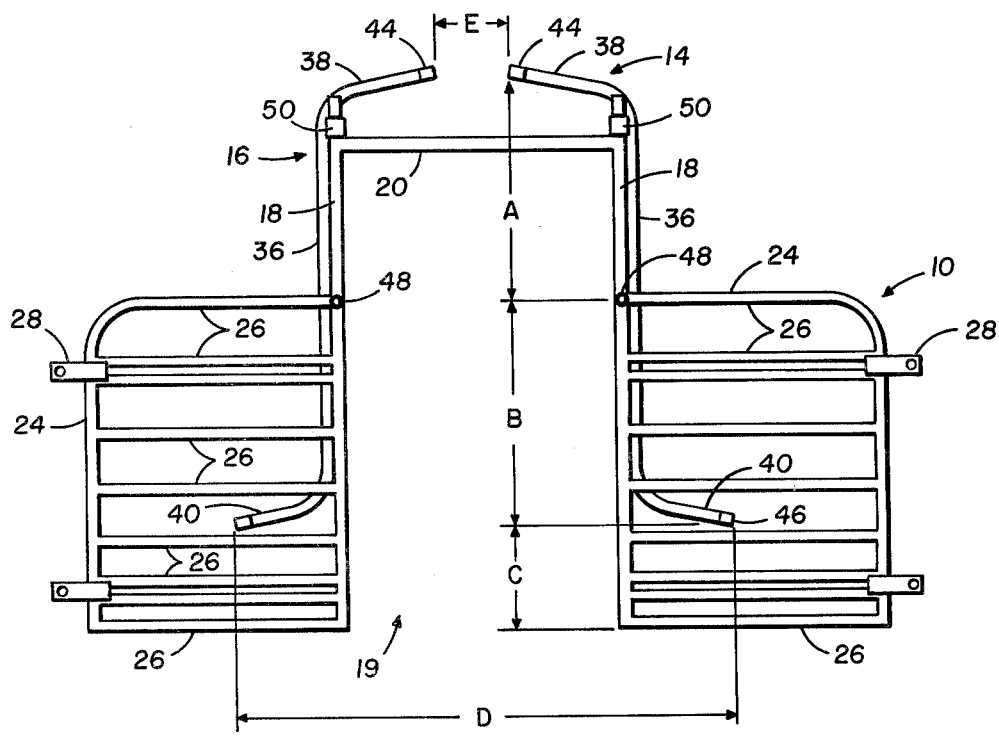
FIG. 2 is an end elevational view of the farrowing crate showing the side panels in one position.
Figure 3:
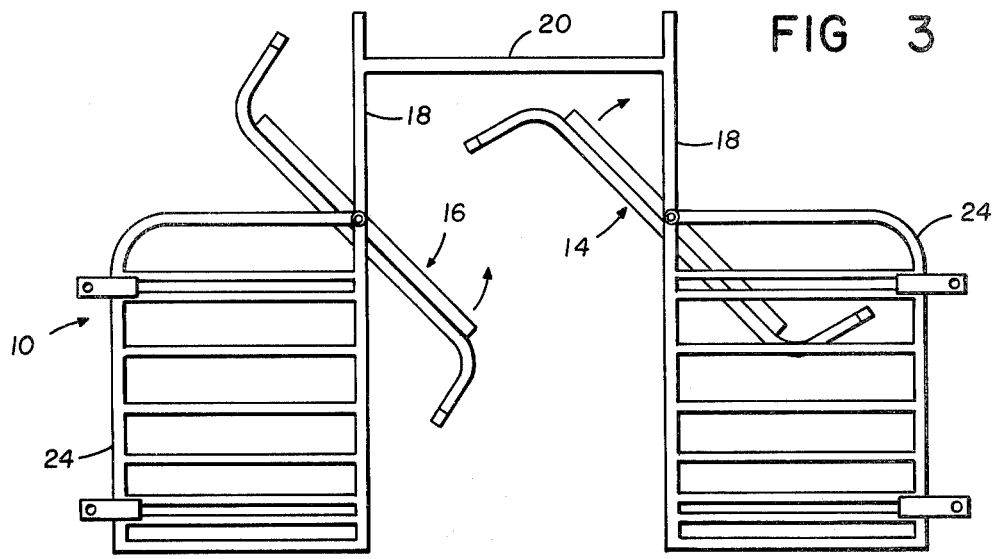
FIG. 3 is an end view similar to FIG. 2 but showing the side panels being rotated from one position to another.

Each of the side panels 14 and 16 includes a rectangular-shaped frame that has vertically extending spaced-apart uprights 32 joined at their ends by horizontal parallel spaced-apart members 34. Extending vertically across the horizontal members 34 are a plurality of spaced-apart vertically extending bars 36 each of which has a curved or flared end portion 38 that extends inwardly (FIG. 2) while the other end of each of the vertical bars 36 has a curved or flared portion 40 extending outwardly. In addition, central support members 42 extends horizontally across the vertical bars 36 between the horizontal members 34 to provide added strength to the side panels 14 and 16. Also, a horizontal bar 44 is connected to the outer ends of the flared portions 38 while a horizontal bar 46 is connected to the outer ends of the flared portions 40. A pivot pin 48 pivotally interconnects each of the vertical uprights 32 with the corresponding vertical upright 18 of an end panel 10 or 12. Pivot pin 48 is held in place in any suitable manner. As best seen in FIG. 2, the distance "A" from the pivot pin 48 to the horizontal bar 44 is slightly greater than the distance "B" from the pivot pin 48 to the horizontal bar 46, and when either the side panel 14 or 16 is positioned with the horizontal bar 44 at the top, the distance "C" between the ground or floor to the other horizontal bar 46 will be greater than when a side panel 14 or 16 is positioned with horizontal bar 44 at the bottom.

Figure 4:
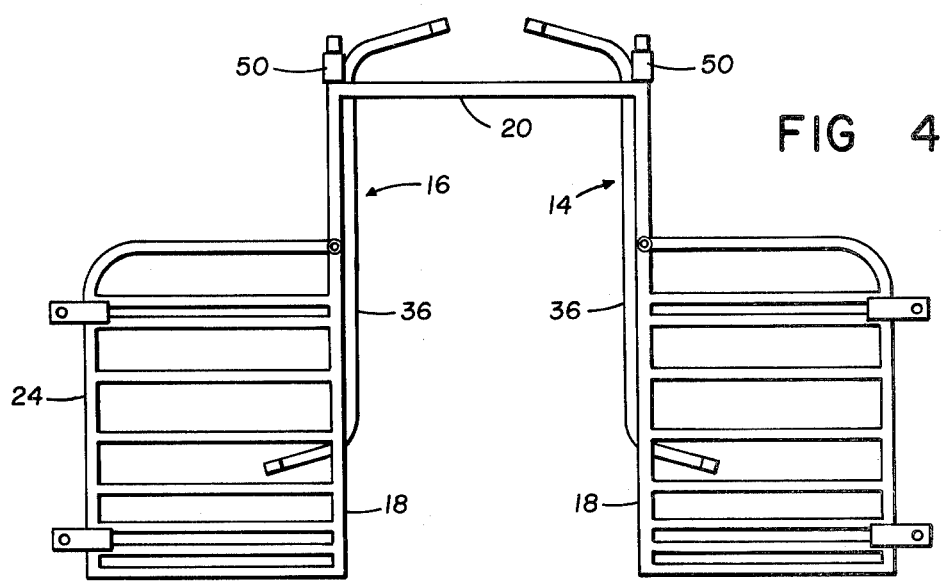
FIG. 4 is an end view similar to FIG. 2 but showing both side panels swung to the other position.

Also, the flared portions 38 and 40 of side panels 14 and 16 are constructed so that horizontal distances between the bars 44 and 46 (or a bar 44 and a bar 46) vary according to the position of the panels 14 and 16. For example, with both side panels 14 and 16 in the position shown in FIG. 2, the distance "D" is at its maximum and the distance "E" at the top is also at its maximum. On the other hand, with side panels 14 and 16 both swung 180° to the positions shown in FIG. 4, distances "D" and "E" are both at their minimum "spacing". If one side panel 14 or 16 is positioned with the horizontal bar 46 at the top, distances "D" and "E" will be approximately half the difference between the maximum and minimum settings. These three variables provide "small", "medium" and large settings for crate size.

Thus, depending upon the size of the sow confined in the farrowing crate, a side panel 14 or 16 is swung to one position or the other, that is, with the horizontal bar 44 at the top or at the bottom. Also, because the flared ends 38 and 40 will, when at the bottom position, always extend outwardly regardless of the position of the side panels 14 or 16, there is more room for the sow to lie down for nursing her young. I have found that a sow will lie down with her back against and beneath the lower flared ends (either 38 or 40) of the vertical bars 36.

The swingable side panels 14 and 16 provide the additional advantage of allowing the crate to be easily cleaned when both side panels are swung about 45° from their locked position.

Moreover, when a side panel 14 or 16 is in one position as shown in FIG. 2, the vertical bars 36 are on the outside of the horizontal members 34, but when the side panel 14 or 16 is turned to its other position (FIG. 4) the vertical bars 36 are on the inside of the horizontal members 34. If the bars 36 and members 34 are constructed of tubing having an exterior dimension of one and one-quarter (1¼)inches, the interior width of the farrowing crate can be varied two and one-half (2½) inches. Although this is seemingly a small difference, the experienced hog breeder will recognize its significance.

Figure 5:
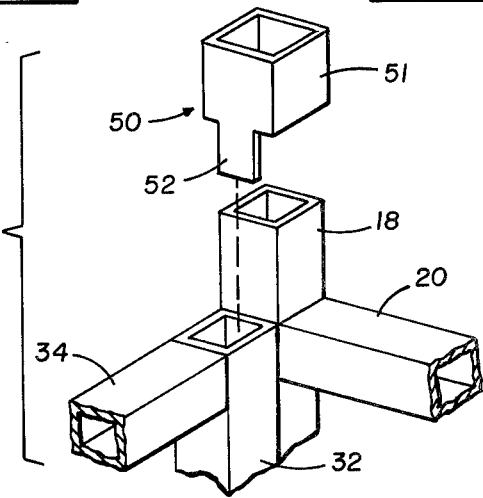
FIG. 5 is an enlarged perspective view showing the adjustable fastening means for interconnecting the side and end panels of the farrowing crate.

In order to hold the side panels 14 and 16 in a selected position, I prefer to provide fastening members 50. As best seen in FIG. 5, each of the fastening members 50 has a hollow main body 51 with an interior configuration and dimension corresponding to the exterior shape and dimension of the vertical upright 18 of the end panels 10 and 12. Thus, the fastener 50 will easily slide down over the upper end of a vertical upright 18. Fastener 50 also has a downwardly extending lip 52 formed integrally with one of the side walls of main body 51, and when the fastener 50 is in a locking position, lip 52 extends into the open end of the respective vertical member 32 of side panel 14 or 16. One of the fasteners 50 is provided on each of the vertical uprights 18 for both the front end panel 10 and rear end panel 12 thus securely locking the side panels 14 in place in a selected position. Rotating side panel 14, for example, from one position to another is a very simple operation and is accomplished by merely sliding the fasteners 50 on one side of the end panel 10 and rear panel 12 until the lip 52 is disengaged from the side panel 14. Side panel 14 is then rotated 180° to its other position and the fasteners 50 are moved downwardly until the lips 52 are engaged once again in the open end of the vertical members 32 of the side panel 14. Thus, adjustment of the interior dimensions of the crate is accomplished without disconnecting and reconnecting bolts, pins or other fastening means, and can be accomplished without the use of any hand tools.

The operation and use of my novel farrowing crate should be obvious from the foregoing description of its construction. By pivoting one or both of the side panels 14 or 16 from a selected position to the other, the farrowing crate can be adapted for a variety of sizes of sows. Because this is accomplished simply without the use of tools, it can be done quickly. Also, because the farrowing crate is constructed almost entirely of tubing that is welded together, the cost of manufacture of the crate is kept to a minimum. Moreover, the crate is quickly and easily disassembled and the various components which are substantially flat can be easily moved from one location to another.

Having thus described my invention in connection with the preferred embodiment thereof, it will be obvious to those skilled in the art that various revisions and modifications can be made to the preferred embodiment without departing from the spirit and scope of the invention. It is my intention, however, that all such revisions and modifications as are obvious to those skilled in the art will be included within the scope of the following claims.

I claim:

1. A farrowing crate for sows and the like, said crate comprising spaced-apart front and rear panels, side panels combined with said front and rear panels to form a generally rectangular enclosure, each of said side panels having a central portion and an upper portion extending inwardly from the central portion and a lower portion extending outwardly from the central portion in a direction opposite to the upper portion, the central portion of each said side panels being pivotally joined to the front and rear panels for pivotal movement of the side panel about a substantially horizontal axis, the perpendicular distance from the plane of the central portion of each side panel to the outer edge of the upper portion being greater than the perpendicular distance from the plane of the central portion to the outer edge of the lower portion when said side panel is positioned with the upper portion at the top, and means for maintaining each side panel in a selected position with the upper portion positioned either above the central portion or below the central portion so that the width of the enclosure can be varied.

2. The farrowing crate of claim 1 in which the pivot point of each side panel is fixed, and the distance from the pivot point of each side panel to the outer edge of the upper portion is greater than the distance from the pivot point to the outer edge of the lower portion.

3. The farrowing crate of claim 1 in which the front and rear panels each include an upwardly extending portion near the juncture with a side panel, and a locking member is engageable with each of said upwardly extending portions and with a portion of a side panel so as to maintain the side panel in a selected position.

4. The farrowing crate of claim 3 in which the locking member includes a portion movable relative to said upwardly extending portion, and said locking member also includes a portion positively engageable with the central portion of a side panel so as to maintain said side panel in a selected position.

5. The farrowing crate of claims 1, 2, 3 or 4 in which said front and rear panels extend outwardly beyond said side panel, and a side divider panel is fixed to the outer ends of said extended front and rear panels.

6. The farrowing crate of claims 1, 2, 3 or 4 in which said front and rear panels each include a door.

* * * * *